(12) United States Patent
Gupta (10) Patent No.: US 12,355,636 B2
(45) Date of Patent: Jul. 8, 2025

(54) ADAPTIVE CHANGE MANAGEMENT FRAMEWORK (ACMF) SYSTEMS, APPARATUSES, AND COMPUTER-IMPLEMENTED METHODS

(71) Applicant: ATLASSIAN PTY LTD., Sydney (AU)

(72) Inventor: Rahul Gupta, Hyderabad (IN)

(73) Assignee: Atlassian Pty, Ltd., Sydney (AU)

( * ) Notice: Subject to any disclaimer, the term of this patent is extended or adjusted under 35 U.S.C. 154(b) by 0 days.

(21) Appl. No.: 18/478,205

(22) Filed: Sep. 29, 2023

(65) Prior Publication Data
US 2025/0112835 A1 Apr. 3, 2025

(51) Int. Cl.
*H04L 41/28* (2022.01)
*H04L 41/0823* (2022.01)
*H04L 41/22* (2022.01)

(52) U.S. Cl.
CPC .......... *H04L 41/28* (2013.01); *H04L 41/0823* (2013.01); *H04L 41/22* (2013.01)

(58) Field of Classification Search
CPC ...... H04L 41/28; H04L 41/0823; H04L 41/22
USPC ....................................................... 709/223
See application file for complete search history.

(56) References Cited

U.S. PATENT DOCUMENTS

| | | | | |
|---|---|---|---|---|
| 6,574,675 B1 * | 6/2003 | Swenson | .................... | H04L 9/40 719/316 |
| 11,743,144 B2 * | 8/2023 | Duggal | .............. | G06Q 30/0635 717/120 |
| 2008/0288621 A1 * | 11/2008 | Snell | ...................... | G06Q 10/06 715/765 |
| 2010/0226488 A1 * | 9/2010 | El Osta | ............... | H04L 61/4552 379/221.14 |
| 2022/0239550 A1 * | 7/2022 | Parwani | .................. | H04L 41/22 |
| 2023/0315732 A1 * | 10/2023 | Bokhan-Dilawari | ........ | G06F 16/2448 707/718 |
| 2023/0315789 A1 * | 10/2023 | Werner | ............... | G06F 16/9027 |
| 2023/0318935 A1 * | 10/2023 | Sergeev | ............. | H04L 41/0896 709/223 |

FOREIGN PATENT DOCUMENTS

WO WO-02091194 A1 * 11/2002 ......... H04L 41/5054

* cited by examiner

*Primary Examiner* — Anthony Mejia
(74) *Attorney, Agent, or Firm* — Alston & Bird LLP (57) ABSTRACT

Systems, apparatuses, computer-implemented methods, computing devices, and/or the like are provided. In some embodiments, an adaptive change management framework (ACMF) system for service operations includes a module management service (MMS) configured to define CMDOs associated with one or more stages of a change management lifecycle, wherein each CMDO is structured to include at least one of: rule definition data, acceptance criteria data, or stage duration data; a workflow management service (WMS) configured to define one or more workflow objects, wherein the one or more workflow objects comprise linked combinations of CMDOs; and a change management service (CMS) configured to cause rendering of an ACMF interface comprising task interface elements associated with the one or more workflow objects.

20 Claims, 4 Drawing Sheets

ADAPTIVE CHANGE MANAGEMENT FRAMEWORK (ACMF) SYSTEMS, APPARATUSES, AND COMPUTER-IMPLEMENTED METHODS

TECHNICAL FIELD

The present disclosure relates generally to a framework for providing service operations. In particular, it relates to an adaptive change management framework (ACMF) system for providing service operations.

BACKGROUND

Information technology (IT) service management tools provide IT infrastructure library (ITIL) workflows and templates for managing service operations in an organization. Applicant has identified a number of technical problems associated with conventional IT service management tools. Through applied effort, ingenuity, and innovation, the Applicant has solved these and other technical problems relating to service operations by developing solutions embodied in the present disclosure, which are described in detail below.

SUMMARY

In general, embodiments of the present disclosure provide ACMF systems, apparatuses for providing an ACMF, and computer-implemented methods for defining an ACMF, and/or the like.

According to various embodiments, there is provided an adaptive change management framework (ACMF) system for service operations. In some embodiments, the ACMF system includes a module management service (MMS) configured to define CMDOs associated with one or more stages of a change management lifecycle, wherein each CMDO is structured to include at least one of: rule definition data, acceptance criteria data, or stage duration data; a workflow management service (WMS) configured to define one or more workflow objects, wherein the one or more workflow objects include linked combinations of CMDOs; and a change management service (CMS) configured to cause rendering of an ACMF interface including task interface elements associated with the one or more workflow objects.

In some embodiments, the one or more stages includes a create stage, a review stage, an approve stage, or a plan stage.

In some embodiments, the CMDOs are configured to define an intensive state based on user configuration of the rule definition data, acceptance criteria data, or stage duration data.

In some embodiments, the ACMF system further includes a module data store, wherein the module data store is configured to store the CMDOs.

In some embodiments, the ACMF system further includes a workflow data store, wherein the workflow data store is configured to store the one or more workflow objects.

In some embodiments, the ACMF system further includes a usage data store, wherein the usage data store is configured to store usage data from the one or more workflow objects.

In some embodiments, the ACMF system further includes one or more machine learning (ML) modules configured to access one or more of the module data store, the workflow data store, and the usage data store and to thereby generate training data for defining the one or more modules or the one or more workflow objects.

In some embodiments, the WMS is further configured to receive one or more pieces of metadata to further define the one or more workflow objects.

In some embodiments, the one or more pieces of metadata include: a designation for a user with permissions to review or approve the one or more CMDOs; or a designation for a communication channel for one or more users to collaborate on the one or more CMDOs.

In some embodiments, the CMS include a plurality of microservices, and wherein each microservice of the plurality of microservices includes a respective data store configured to execute the one or more stages of the change management lifecycle.

According to various embodiments, there is provided an apparatus for providing an adaptive change management framework (ACMF), the apparatus including a processor; and a non-transitory memory including program code, wherein the non-transitory memory and the program code are configured to, with the processor, cause the apparatus to provide: a module management service (MMS) configured to define CMDOs associated with one or more stages of a change management lifecycle, wherein each CMDO is structured to include at least one of: rule definition data, acceptance criteria data, or stage duration data; a workflow management service (WMS) configured to define one or more workflow objects, wherein the one or more workflow objects include linked combinations of CMDOs; and a change management service (CMS) configured to cause rendering of an ACMF interface including task interface elements associated with the one or more workflow objects.

In some embodiments, the one or more stages include a create stage, a review stage, an approve stage, or a plan stage.

In some embodiments, the CMDOs are configured to define an intensive state based on user configuration of the rule definition data, acceptance criteria data, or stage duration data.

In some embodiments, the apparatus is further configured to provide a module data store, and wherein the module data store is configured to store the CMDOs.

In some embodiments, the apparatus is further configured to provide a workflow data store, and wherein the workflow data store is configured to store the one or more workflow objects.

In some embodiments, the apparatus is further configured to provide a usage data store, and wherein the usage data store is configured to store usage data from the one or more workflow objects.

In some embodiments, the apparatus is further configured to provide one or more machine learning (ML) modules configured to store training data from one or more of the module data store, the workflow data store, and the usage data store, wherein the one or more ML modules are configured to generate one or more suggestions for defining the one or more modules or the one or more workflow objects.

In some embodiments, the WMS is further configured to receive one or more pieces of metadata to further define the one or more workflow objects.

In some embodiments, the one or more pieces of metadata include: a designation for a user with permissions to review or approve the one or more CMDOs; or a designation for a communication channel for one or more users to collaborate on the one or more CMDOs.

According to various embodiments, there is provided a computer-implemented method for defining an adaptive change management framework (ACMF), the method including: defining, by a module management service (MMS), CMDOs, wherein the CMDOs include one or more stages of a change management lifecycle; defining, by a workflow management service (WMS), one or more workflow objects, wherein the one or more workflow objects include one or more combinations of the CMDOs; and rendering, by a change management service (CMS), an ACMF interface including task interface elements associated with the one or more workflow objects.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment).

Definitions

The term "Adaptive Change Management Framework (ACMF) system" refers to the software platform(s) and associated hardware that is configured to support, maintain, and manage a plurality of issues, tasks, workspaces, and all associated functions. The ACMF system includes a module management service (MMS), a workflow management service (WMS), and a change management service (CMS), which are each defined below. The ACMF system takes inputs from user(s) and admin(s) to create and manage a plurality of configurable module data objects (CMDOs) that are associated with one or more stages of a service operation. The ACMF system creates different combinations and sequences of the one or more stages. The combinations and sequences are based at least in part on usage patterns, organizational goals/structure, or the combinations and sequences may be based on patterns that are recommended to users depending on their project goals to provide a more flexible change management framework.

An example ACMF system may be based on ITIL, including change managers, change advisory board, and release management teams for risk averse operations that focus on managing risk over changing throughput. An ITIL-based ACMF system may focus on improving the change review and approval process to ensure stability.

Another example ACMF system may be based on DevOps focused on improving the change throughput (or change velocity) of service operations, going easy on processes and avoiding human interaction as much as possible. DevOps aims to improve throughput/velocity without losing stability and hence refers back to ITIL methods of managing changes to improve visibility.

Further examples of ACMF systems may adopt aspects of ITIL-type ACMF systems and DevOps-type ACMF systems. That is, an example ACMF system may mix and match processes from ITIL-type systems as well as from DevOps-type systems, varying the design of the system across a spectrum of customers providing and managing service operations.

The term "module management service" (MMS) refers to a program configured to interact with the ACMF system to define CMDOs associated with one or more stages of a change management lifecycle. The MMS is accessed by system administrators and utilized to define the CMDOs, which are then be provided to one or more users. The MMS stores usage data in a module data store, which is accessed by a recommendation engine to train machine learning (ML) modules to provide suggestions for combinations and/or sequences of modules. These suggestions for combinations and/or sequences of modules are provided to the users, as well. The MMS may also provide out-of-box templates for various modules; that is, the MMS may provide predefined sets of stages for a change management lifecycle.

The term "workflow management service" (WMS) refers to a program configured to interact with the ACMF system to define one or more workflow objects. The WMS selects module data (that is, data about the CMDOs) from the module data store and provides it to an admin for defining workflow objects. Various workflow objects are saved in a workflow data store. The WMS may also provide out-of-box templates for workflow objects. Example templates include a template for change management workflow for a high-risk change, for a tier-2 service, and/or for the professional services industry. The various workflow objects may be used to train ML modules to provide suggestions for combinations and/or sequences of CMDOs. Administrators may provide metadata to various parts of the workflow objects, such as adding in users who would review a change, add users who would approve a change, defining a channel for collaboration, and/or the like.

The term "change management service" (CMS) refers to a program configured to interact with the ACMF system to render an ACMF interface having task interface elements associated with one or more workflow objects. The CMS causes a rendering of an ACMF interface having task interface elements associated with the one or more workflow objects. The CMS may allow an admin or users to execute the change management workflow. The CMS provides multiple services, each of which provides its own data store to execute various steps within the framework of the ACMF system. The CMS compiles usage data for storage in a Usage Data Store, which may be used to train an ML module.

The term "ACMF Interface" refers to a graphical user interface of an ACMF system that is configured to enable users and administrators to view and engage with one or more issues, tasks, workspaces, and/or the ACMF system. The ACMF interface includes one or more task interface elements associated with one or more workflow objects. The ACMF interface is rendered by the CMS. The ACMF interface may be rendered to one or more devices or apparatuses based on data and instructions provided by the ACMF system.

The term "Task Interface Elements" refer to one or more interactable elements in a graphical user interface for the ACMF system. The task interface elements are rendered by the change management service and displayed virtually to users and/or administrators of the ACMF system. The task interface elements are rendered to a device or apparatus based on data and instructions provided by the ACMF system (e.g., external service alert aggregation interface server). In some embodiments, the data and instructions are facilitated by a dedicated software application running on the client device or apparatus. In other embodiments, the data and instructions are provided through a web browser running on the client device or apparatus.

The term "Change Management Lifecycle" (CML) refers to a sequence of stages for providing service operations to one or more customers. The CML is modified by the ACMF system and one or more of the MMS, WMS, and the CMS. The sequences of stages include a Create stage, a Review stage, an Approve stage, and a Plan stage. Each stage includes one or more CMDOs. The CML is defined to order the sequence of stages in any desired order or configuration.

The term "Configurable Module Data Objects (CMDO or CMDOs)" refers to one or more service operations that are completed by one or more individuals interfacing with the ACMF system. The one or more service operations are created by administrators or generated by the ACMF system. The one or more service operations are broken into various tasks and included within the one or more stages. For example, a Create stage has one or more CMDOs for creating a new feature in the ACMF system. As another example, a Review stage has one or more CMDOs for reviewing the new feature in the ACMF system. Each CMDO includes at least one of a rule definition data, acceptance criteria data, or stage duration data. The CMDOs are stored in a non-transitory memory associated with a computer.

The term "Workflow Objects" refers to linked combinations of CMDOs. For example, a workflow object includes a first CMDO, a second CMDO, and a third module data object, with the first object to be completed before the second and the second to be completed before the third. The workflow objects are defined by the WMS, which is controlled by an administrator of the ACMF system and provided to users of the ACMF system.

The term "stages" refers to the stages that define a change management workflow at a high level. The four stages include a Create stage, a Review stage, an Approve stage, and a Plan stage. The arrangement of the stages are varied depending on the needs of the customer and combined and sequenced appropriately in an ACMF system. Each stage includes various CMDOs and workflow objects, each of which are defined as "lean" or "intensive."

The term "Rule Definition Data" (RDD) refers to individuals (users, admins, etc.) who interact with the ACMF system and the various services and are tasked with approving, managing, and/or working on the CMDOs. An example RDD defines one or more individuals with authority to approve one or more CMDOs within the one or more stages.

The term "Acceptance Criteria Data" (ACD) refers to various criteria determining if/when one or more stages of the CMDOs will be accepted by the ACMF system. An example ACD is completion of a task associated with one or more CMDOs.

The term "Stage Duration Data" (SDD) refers to the length of time a stage may be worked on before the stage may be progressed to the next stage. An example SDD is a number of months, such as three months, before the one or more CMDOs are approved.

The term "Intensive State" refers to CMDOs that are above one or more thresholds defined for the RDD, the ACD, and/or the SDD. If a CMDO exceeds one or more of the thresholds defined for the RDD, the ACD, and/or the SDD, then the CMDO may be qualified as being in an intensive state. An intensive state will include complex sub-workflows having stringent processes over a sustained period. For example, if the stage duration data is defined as six months for a given CMDO, then it is defined as a CMDO in an intensive state. By contrast, a "lean state" refers to CMDOs that are not in an intensive stage. A lean state includes a high amount of automation with fewer steps and processes that are less stringent than the intensive state.

The term "Metadata" refers to one or more pieces of information that further define the one or more workflows. Metadata includes various data that characterize the workflows, or one or more CMDOs within the workflows. Example metadata includes designations for those users with permissions to approve the one or more CMDOs or designating a communication channel for one or more users to collaborate on the one or more CMDOs.

The term "Module Data Store" refers to a non-transitory memory (software or hardware) that is configured to store the CMDOs. The module data store is accessed by various services associated with the ACMF system. The module data store may also be accessed by a machine learning module that may access and utilize the CMDOs to train the machine learning module and generate feedback data for the ACMF system.

The term "Workflow Data Store" refers to a non-transitory memory (software or hardware) that is configured to store the one or more workflow objects. The workflow data store is accessed by various services associated with the ACMF system. The workflow data store may also be accessed by a machine learning module that may access and utilize the workflow objects to train the machine learning module and generate feedback data for the ACMF system.

The term "Usage Data Store" refers to a non-transitory memory (software or hardware) that is configured to store usage data from the one or more workflow objects. The usage data store is accessed by various services associated with the ACMF system. The usage data store is also accessed by a machine learning module that may access and utilize the usage data to train the machine learning module and generate feedback data for the ACMF system. For example, a machine learning module analyzes usage data from the one or more workflow objects to detect history of usage by various users, and then uses this historical data to predict future usage date from one or more workflow objects.

The terms "client device", "computing device", "user device", and the like may be used interchangeably to refer to computer hardware that is configured (either physically or by the execution of software) to access one or more of an application, service, or repository made available by a server (e.g., apparatus of the present disclosure) and, among various other functions, is configured to directly, or indirectly, transmit and receive data. The server is often (but not always) on another computer system, in which case the client device accesses the service by way of a network. Example client devices include, without limitation, smart phones, tablet computers, laptop computers, wearable devices (e.g., integrated within watches or smartwatches, eyewear, helmets, hats, clothing, earpieces with wireless connectivity, and the like), personal computers, desktop computers, enterprise computers, the like, and any other computing devices known to one skilled in the art in light of the present disclosure.

The terms "data," "content," "digital content," "digital content object," "signal," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "communication channel" refers to a wired or wireless transmission medium for transmitting data between a client device and an application framework system. To communicatively couple a client device and an application framework system, a communication channel can be integrated with a component management interface, an API, a communication interface. In an example, the communication channel can be a network communication channel that communicatively couples a client device and an application framework. A communication channel can be related to a portal, chat (e.g., Slack, Microsoft Teams), email, web, widget, API call, text, notification, telephone, video, and/or other type of communication. In various embodiments, a communication channel can be configured for transmitting messages and/or signals such as, for example, service messages or service signals, between a client device and an application framework.

The term "microservices" refers to a set of services that are interconnected and independently configured to provide a service. In some embodiments, a microservice is configured with one or more APIs integrated with one or more other microservices and/or one or more other applications. In some embodiments, a microservice is a single-function module with a defined set of interfaces and/or a defined set of operations configured to integrate with one or more other microservices and/or one or more other applications to provide a monolith service.

The term "library" refers to a collection of objects (e.g., a collection of component objects, a collection of service objects, etc.), a collection of functions, and/or a collection of processing threads associated with one or more components.

The term "service" refers to a visual representation of one or more workflow objects or CMDOs. In some embodiments, a service is configured for viewing data, searching for data, creating data, updating data, managing relationships among data, assigning attributes related to data, and/or storing data associated with one or more data structures. In some embodiments, a service is configured as a system, tool or product to facilitate viewing data, searching for data, creating data, updating data, managing relationships among data, assigning attributes related to data, and/or storing data associated with one or more data structures. In some embodiments, a service includes a set of metadata attributes associated with a technical capability, a technical configuration, an application capability, an application configuration, and/or another metadata attribute. In some embodiments, a service is published to one or more client devices via one or more APIs. In some embodiments, a service is a logical representation of an application stack. In some embodiments, a service corresponds to one or more microservices.

The term "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media.

Examples of non-transitory computer-readable media include a magnetic computer readable medium (e.g., a floppy disk, hard disk, magnetic tape, any other magnetic medium), an optical computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use computer-readable storage medium, other types of computer-readable mediums can be substituted for or used in addition to the computer-readable storage medium in alternative embodiments.

The terms "ACMF application" or "ACMF app" refer to a dedicated software program, application, platform, service, web browser, or computer-executable application software programmed or configured to run on a client device which provides the user access to the ACMF system and its associated functionality. In some embodiments, the ACMF application may include hardware, software, or combinations thereof operating remotely (e.g., on a server). In some embodiments, the ACMF application is designed to execute on mobile devices, such as tablets or smartphones. For example, in certain embodiments, an app is provided that executes on mobile device operating systems such as iOS®, Android®, or Windows®. These platforms typically provide frameworks that allow apps to communicate with one another and with particular hardware and software components of mobile devices. For example, the mobile operating systems names above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

The terms "application," "software application," "app," "product," "service" or other similar terms refer to a computer program or group of computer programs designed to perform coordinated functions, tasks, or activities for the benefit of a user or group of users. A software application can run on a server or group of servers (e.g., physical or virtual servers in a cloud-based computing environment). In certain embodiments, an application is designed for use by and interaction with one or more local, networked or remote computing devices, such as, but not limited to, client devices. Non-limiting examples of an application comprise project management, workflow engines, service desk incident management, team collaboration suites, cloud services, word processors, spreadsheets, accounting applications, web browsers, email clients, media players, file viewers, videogames, audio-video conferencing, and photo/video editors. In some embodiments, an application is a cloud product.

The terms "machine learning module," "machine learning model," "ML module(s)," or "ML model(s)" refer to a machine learning or deep learning task or mechanism. The term "machine learning" refers to a method used to devise complex models and algorithms that lend themselves to prediction. A machine learning model is a computer-implemented algorithm that may learn from data with or without relying on rules-based programming. These models enable reliable, repeatable decisions and results and uncovering of hidden insights through machine-based learning from historical relationships and trends in the data. In some embodiments, the machine learning model is a clustering model, a regression model, a neural network, a random forest, a decision tree model, a classification model, or the like.

A machine learning model is initially fit or trained on a training dataset (e.g., a set of examples used to fit the parameters of the model). The model may be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted.

The machine learning models as described herein may make use of multiple ML engines (e.g., for analysis, transformation, and other needs). The system may train different ML models for different needs and different ML-based engines. The system may generate new models (based on the gathered training data) and may evaluate their performance against the existing models. Training data may include any of the gathered information, as well as information on actions performed based on the various recommendations.

The ML models may be any suitable model for the task or activity implemented by each ML-based engine. Machine learning models may be some form of neural network. The underlying ML models may be learning models (supervised or unsupervised). As examples, such algorithms may be prediction (e.g., linear regression) algorithms, classification (e.g., decision trees) algorithms, time-series forecasting (e.g., regression-based) algorithms, association algorithms, clustering algorithms (e.g., K-means clustering, Gaussian mixture models, DBscan), or Bayesian methods (e.g., Naïve Bayes, Bayesian model averaging, Bayesian adaptive trials), image to image models (e.g., FCN, PSPNet, U-Net) sequence to sequence models (e.g., RNNs, LSTMs, BERT, Autoencoders) or Generative models (e.g., GANs).

The ML models may implement statistical algorithms, such as dimensionality reduction, hypothesis testing, one-way analysis of variance (ANOVA) testing, principal component analysis, conjoint analysis, neural networks, support vector machines, decision trees (including random forest methods), ensemble methods, and other techniques. Other ML models may be generative models (such as Generative Adversarial Networks or auto-encoders).

In various embodiments, the ML models may undergo a training or learning phase before they are released into a production or runtime phase or may begin operation with models from existing systems or models. During a training or learning phase, the ML models may be tuned to focus on specific variables, to reduce error margins, or to otherwise optimize their performance. The ML models may initially receive input from a wide variety of data, such as the gathered data described herein. The ML models herein may undergo a second or multiple subsequent training phases for retraining the models.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The terms "illustrative," "example," "exemplary" and the like are used herein to mean "serving as an example, instance, or illustration" with no indication of quality level. Any implementation described herein as "exemplary" is not necessarily to be construed as preferred or advantageous over other implementations.

The phrases "in one embodiment," "according to one embodiment," and the like generally mean that the particular feature, structure, or characteristic following the phrase may be included in the at least one embodiment of the present invention and may be included in more than one embodiment of the present invention (importantly, such phrases do not necessarily refer to the same embodiment).

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "plurality" refers to two or more items.

The term "set" refers to a collection of one or more items.

The term "or" is used herein in both the alternative and conjunctive sense, unless otherwise indicated.

Having set forth a series of definitions called-upon throughout this application, an example system architecture and example apparatus is described below for implementing example embodiments and features of the present disclosure.

Overview

According to various embodiments, there is provided an adaptive change management framework (ACMF) system for providing service operations across different organizations. In some embodiments, an ACMF framework for service operations is defined by a plurality of stages: Create, Review, Approve, and Plan (CRAP). In some embodiments, the stages include one or more substages, each of which varies in level of complexity. For example, a stage or substage is defined as a "lean" or an "intensive" stage (e.g., a "lean" approve stage and an "intensive" approve stage). Such "lean" and "intensive" stages may be variously defined according to numerous factors. For example, a "lean" stage is generally understood as requiring fewer approvals and/or less lead time, while an "intensive" stage is generally understood as requiring a greater number of approval stages and more lead time.

According to various embodiments, an ACMF enables a user to select a combination or sequence of stages that is not necessarily linear. For example, users select combinations and sequences of the stages that prioritize certain development goals (e.g., a "plan" stage may be selected first in an example sequence). In some embodiments, the combinations and sequences are based on usage patterns, organizational goals/structure, or the combinations is based on patterns that are recommended to users depending on their project goals to provide a more flexible change management framework. In some embodiments, users select any combination of sequences. In some embodiments, the ACMF enables users to associate combinations and sequences of workflow objects with CMDOs, and these CMDOs may be enforced by users for service operations. The ACMF also include CMDOs "out-of-box" for users, providing pre-made combinations and sequences for users. In some embodiments, the ACMF makes use of machine-learning to optimize modules using various forms of feedback and metadata.

In some embodiments, there are three core components to the ACMF framework: an MMS, a WMS, and a CMS, as previously defined.

Embodiments described in this disclosure solve various technical problems, including (but not limited to) reducing human effort and computational expense through the use of a library of workflow objects and configurable module data objects, through a set of recommendations and templates, and by making change management frameworks customizable and adaptable for different organizational needs.

Example ACMF System Architecture

Methods, apparatuses, and computer program products of the present disclosure may be embodied by any of a variety of devices. For example, the method, apparatus, and computer program product of an example embodiment may be embodied by a networked device (e.g., an enterprise platform, etc.), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, virtual reality device, augmented reality device, the like, or any combination of the aforementioned devices.

Figure 1:
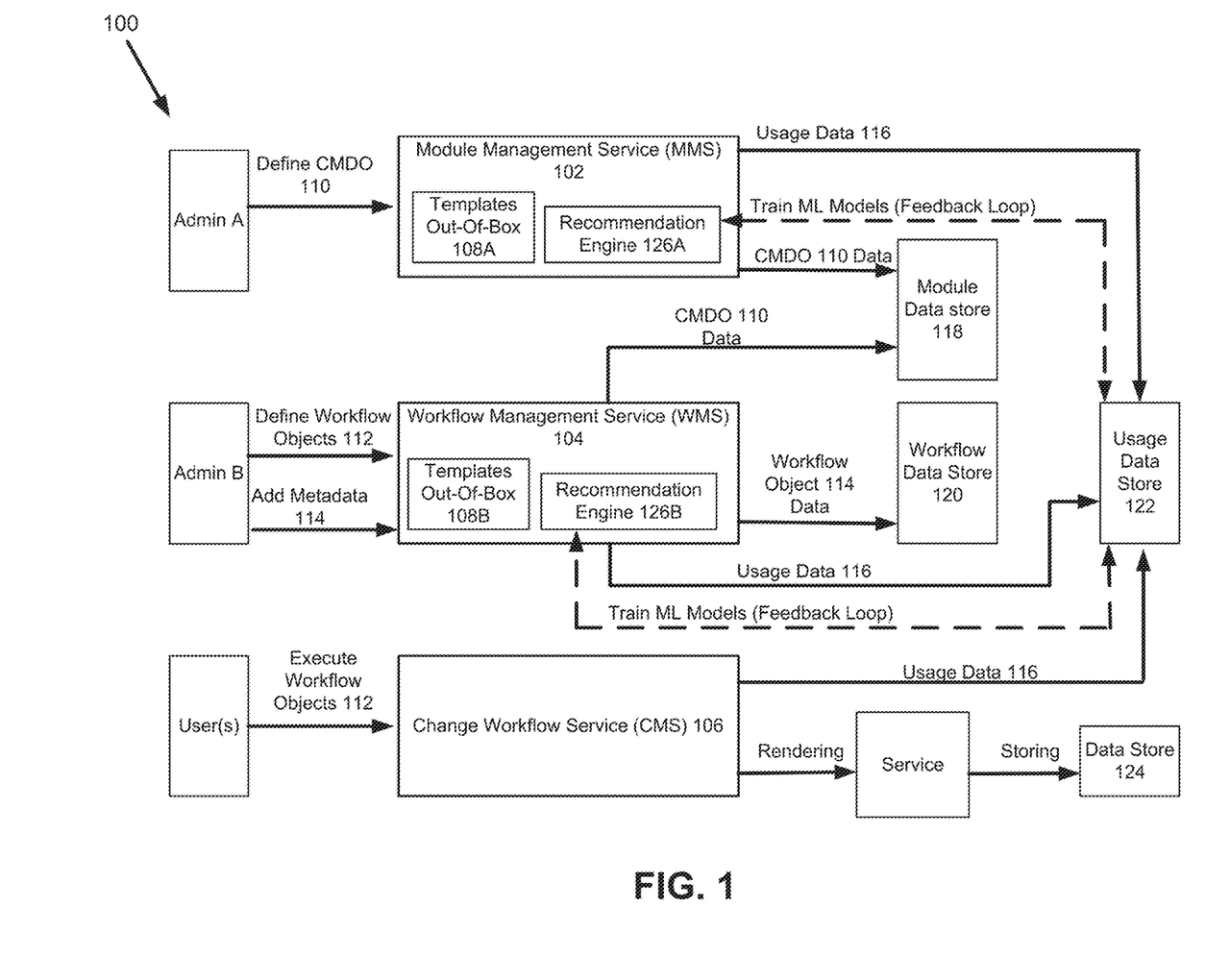
FIG. 1 shows a schematic view of an example data architecture for an example ACMF system in accordance with various embodiments of the present disclosure.

FIG. 1 shows an example data architecture of an example ACMF system 100 (or "system") within which embodiments of the present disclosure operate. In the depicted embodiment, as shown in at least FIG. 1, the ACMF system 100 includes an MMS 102, a WMS 104, and a CMS 106. In some embodiments, the MMS 102, WMS 104, and/or CMS 106 may be stored virtually or physically on hardware in the ACMF system 100. In some embodiments, the MMS 102 and/or WMS 104 are accessed by one or more administrators (e.g., Admin A and/or Admin B) and the CMS 106 is accessed by one or more user(s). It will be understood that access to the various Services 102-106 are varied depending on the needs of the ACMF system 100 and the organization utilizing the ACMF system 100. In some embodiments, the ACMF system 100 may include additional services, not explicitly described here.

Figure 3:
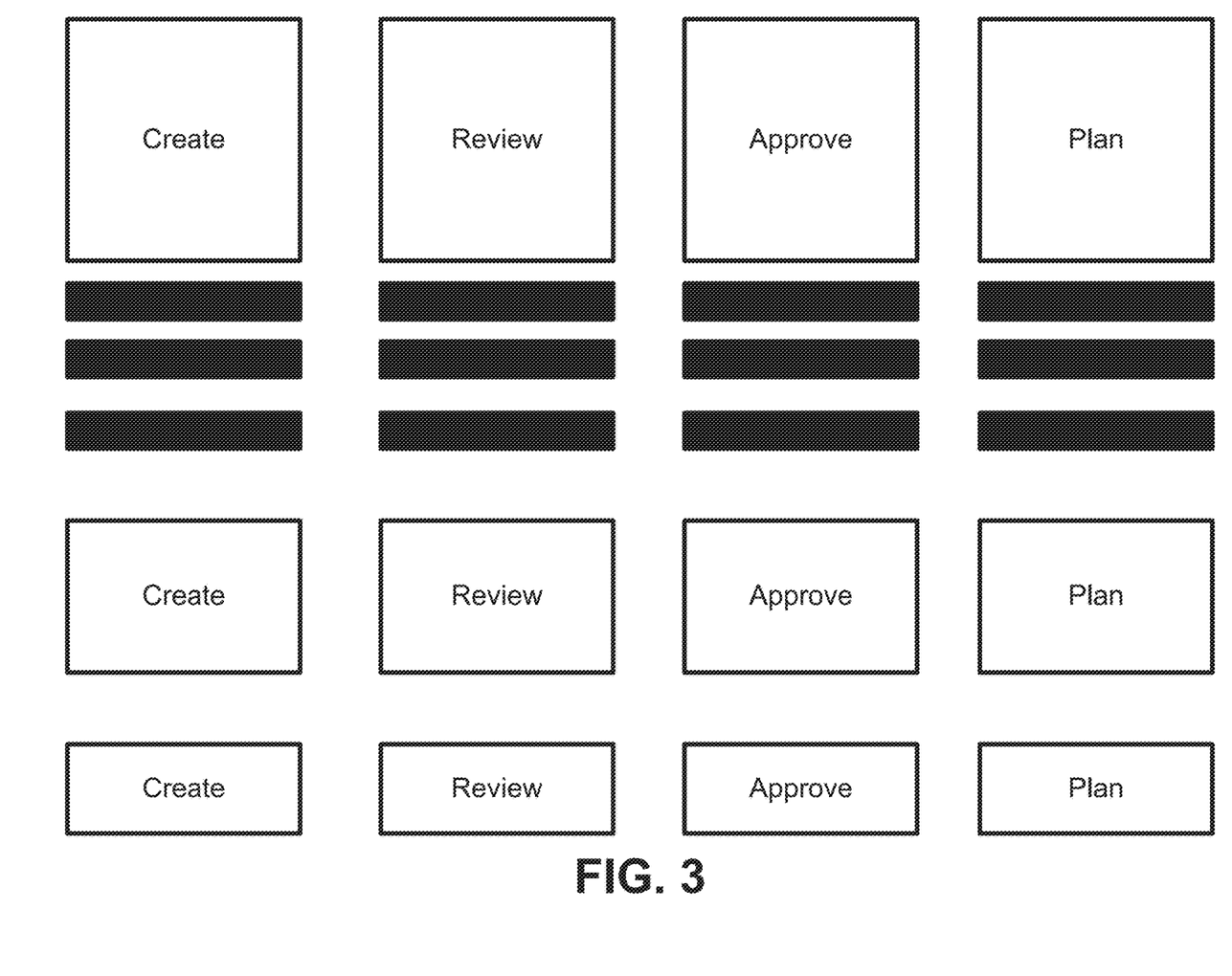
FIG. 3 illustrates an example set of example modules of an example ACMF system in accordance with various embodiments of the present disclosure.

Still referring to FIG. 1, in some embodiments, the MMS 102 is configured to define one or more CMDOs 110. In some embodiments, the one or more CMDOs 110 are associated with one or more stages of a change management lifecycle (e.g., Create, Approve, Plan, and/or Review), as shown in at least FIG. 3. Each CMDO 110 is structured to include at least one of: RDD, ACD, or SDD. In some embodiments, the MMS 102 generates usage data 116 based on, among other things, how the CMDOs 110 are defined (e.g., its RDD, ACD, and/or SDD). In some embodiments, the MMS 102 includes a recommendation engine 126, as will be described later in greater detail later in this disclosure. In some embodiments, the MMS 102 also generates data on the CMDOs 110 that are stored in a module data store 118. In some embodiments, CMDO 110 data may include a name of the module, a type (e.g., create, review, approve, or plan) of the module, the types of industries the module may be used in, whether it's in an intense or lean state, and/or a list of steps. In some embodiments, the MMS 102 generates usage data 116, which is stored in a usage data store 122. The usage data 116 tracks various aspects of how the one or more CMDOs 110 are used within the ACMF system 100. The usage data store 122 is embodied as a memory component, as will be described later in this disclosure, and stores usage data for access later (e.g., by one or more administrators, by ML models, and/or the like). In some embodiments, the usage data includes clickstream data and/or a log of references to workflow objects and/or CMDOs.

In some embodiments, based on one or more of the rule definition data, the acceptance criteria data, and/or the stage duration data, one or more of the CMDOs 110 are defined as being in an "intensive" state or a "lean" state. A CMDO 110 in an intensive state is associated with any one of the one or more stages in the change management lifecycle. A CMDO 110 having an intensive state is considered to have greater complexity relative to the other CMDOs 110 (i.e., relative to those CMDOs 110 in the "lean" state). In some embodiments, a CMDO 110 has an intensive state requiring a greater investment of time, work, and/or the like to complete relative to a CMDO 110 having a lean state.

Still referring to FIG. 1, in some embodiments, the WMS 104 is configured to define one or more workflow objects 112. In some embodiments, the one or more workflow objects 112 include linked combinations of the CMDOs 110. In some embodiments, an administrator of the ACMF system 100 (e.g., Admin B) defines the one or more workflow objects by selecting any combination of CMDOs 110 associated with the various stages, whether or not those CMDOs 110 are in an "intensive" or "lean" state. In some embodiments, the one or more workflow objects 112 may also select any sequence of CMDOs 110 regardless of the sequence of stages (e.g., a workflow object 112 may have a combination of lean and intensive CMDOs 110 and may have one or more intensive CMDOs 110 associated with the Plan stage sequenced before one or more lean CMDOs 110 associated with the Create stage, or vice-versa). In some embodiments, the one or more workflow objects 112 refrain from including CMDOs 110 from certain stages, using only CMDOs 110 that are required for the workflow object 112. In at least this way, the ACMF system 100 enables administrators to define workflow objects 112 that eschew unnecessary stages and focus on the needs of the organization for creating and managing service operations. In some embodiments, the WMS 104 generates data about the CMDOs 110 as well as data about the workflow objects 112. In some embodiments, the WMS 104 stores the data about the CMDOs 110 in the module data store 118 and the data about the workflow objects 112 in the workflow data store 122. In some embodiments, data about the workflow objects 112 may include an identification number, a name, the industries in which the workflow objects may be used, whether the objects are intensive or lean, and a list of the modules. Similarly, the WMS 104 generates usage data 116 that it stores in the usage data store 122.

Still referring to FIG. 1, in some embodiments, the CMS 106 is configured to cause rendering of an ACMF interface having task interface elements associated with one or more workflow objects. In some embodiments, the CMS 106 is engaged with by one or more user(s) of the ACMF system 100 to execute the one or more workflow objects 112. In some embodiments, the CMS 106 is configured to render a service operation for one or more user(s) via the ACMF interface. In some embodiments, the CMS 106 is further configured to store the service in a data store 124, where it is accessed for later usage if necessary/desired. In some embodiments, the CMS 106 provides usage data 116 based on use by the user(s), and this usage data 116 is stored in the usage data store 122.

In some embodiments, one or more of the MMS 102 and/or the WMS 104 includes templates out-of-box 108A, 108B, which define sequences and combinations of CMDOs and workflow objects, respectively. In some embodiments, the templates 108A, 108B are predefined and packaged with the ACMF system 100. That is, when an organization wants to implement the ACMF system 100 to create and manage one or more service operations, the ACMF system 100 has one or more CMDOs and/or workflow objects defined by the templates out-of-box 108A, 108B. In some embodiments, the templates 108A, 108B is predefined based on particular customer types and their needs for service operations. For example, some templates 108A, 108B are designed for ITIL-type ACMF systems and other templates 108A, 108B are designed for DevOps type ACMF systems.

In some embodiments, and as shown in at least FIG. 1, one or more admins (e.g., Admin A and/or Admin B) define one or more of the CMDOs 110 (or "CMDO"), the workflow objects 112, and/or add metadata 114. In some embodiments, one or more user(s), as shown in FIG. 1, also execute the CMDO 110 and provide them to the CMS 106. As previously discussed, in some embodiments, the CMS 106 renders an ACMF interface having task interface elements associated with the one or more workflow objects 112. In some embodiments, the MMS 102, WMS 104, and/or CMS 106 may define CMDOs 110 and workflow objects 112, as well as render the ACMF interface, with or without the active participation of administrators and/or users.

In some embodiments, the metadata 114 is a designation for a user with permissions to review or approve one or more CMDOs 110. In some embodiments, the metadata 114 is a designation for a communication channel for one or more users to collaborate on the one or more CMDOs. In some embodiments, the metadata 114 is stored in one or more of the module data store 118, workflow data store 120, and/or the usage data store 122. In some embodiments, the metadata 114 is also accessed by the one or more recommendation engines 126A, 126B for use in training one or more ML models. In some embodiments, the module data store 118 and/or the workflow data store 120 may be a relational database. In some embodiments, the usage data store 122 may be a non-relational database.

In some embodiments, one or more of the MMS 102 and/or the WMS 104 may include one or more recommendation engines 126A, 126B. In some embodiments, the recommendation engines 126A, 126B are configured to train machine-learning (ML) models in a feedback loop. The recommendation engines 126A, 126B may access the usage data store 122 and, based on patterns of usage from the ACMF system 100, the recommendation engines 126A, 126B may provide CMDOs 110 and/or workflow objects 112, respectively. For example, if usage data 116 show a preference for a particular combination of CMDOs 110 in a given workflow object 112, then the recommendation engines 126A, 126B may configure CMDOs 110 and/or workflow objects 112 for the MMS 102 and/or the WMS 104 based on that usage data 116.

Example Apparatuses for ACME

Figure 2:
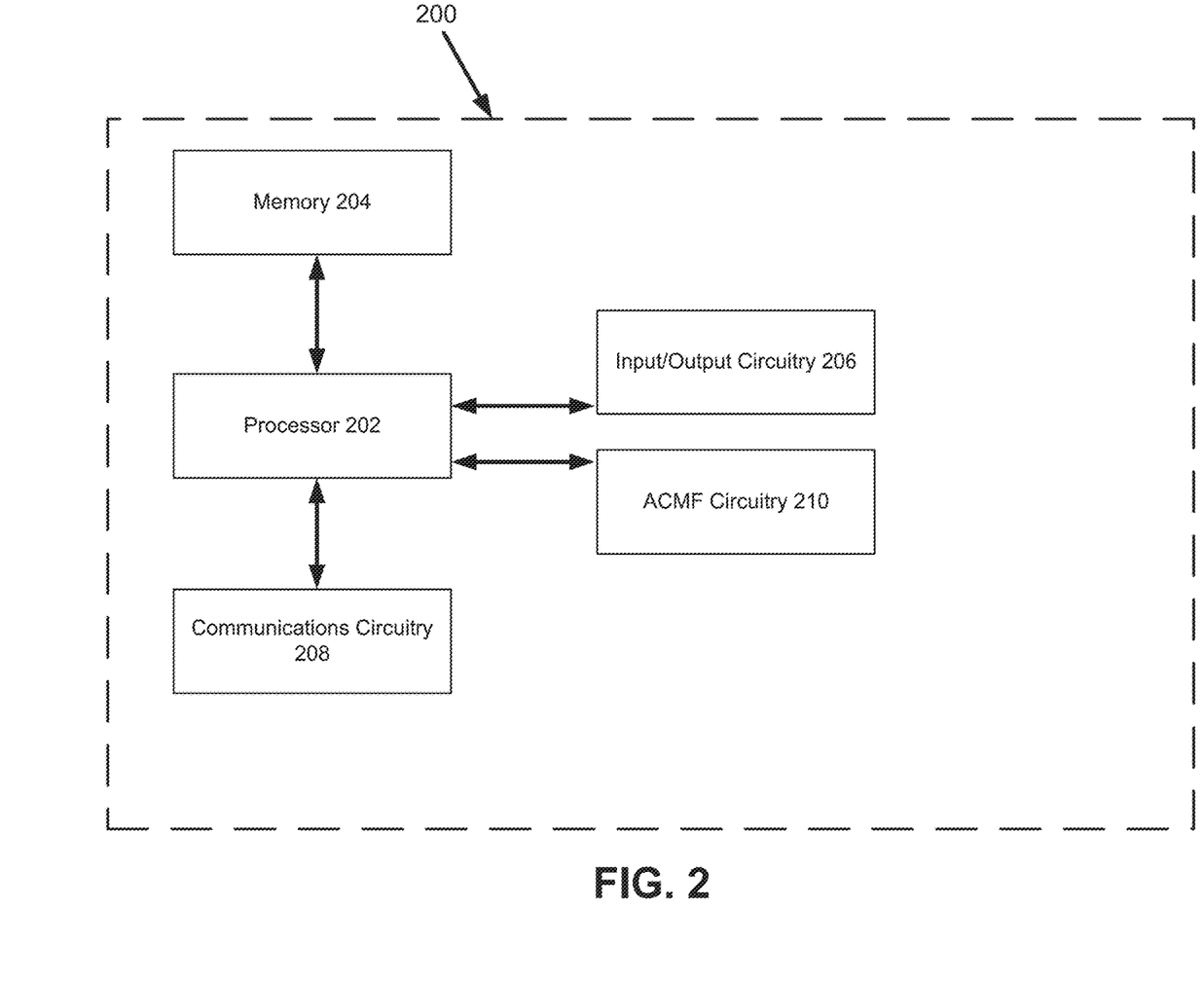
FIG. 2 is a schematic of an example apparatus for providing an ACMF in accordance with various embodiments of the present disclosure.

Referring now to FIG. 2, in the depicted embodiment, the ACMF system 100 is embodied in an apparatus 200, a schematic of which is shown in at least FIG. 2. The apparatus 200 may be configured to execute operations enabled by one or more of the embodiments described in this disclosure. According to various embodiments, the apparatus 200 may be a computer, a user device, or any suitable configuration of hardware and/or software capable of executing operations enabled by the ACMF system 100. In some embodiments, the apparatus 200 includes a processor 202, a memory 204, input/output circuitry 206, communications circuitry 208, and ACMF circuitry 210. The components of the apparatus 200 are described with respect to functional limitations. It should be understood that the particular implementations necessarily include the use of particular hardware. It should also be understood that certain of these components (processor 202, memory 204, input/output circuitry 206, communications circuitry 208, and/or ACMF circuitry 210) may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) is in communication with the memory 204 via a bus for passing information among components of the apparatus. The memory 204 is non-transitory and includes, for example, one or more volatile and/or non-volatile memories. In other words, for example, the memory 204 is an electronic storage device (e.g., a computer-readable storage medium). The memory 204 is configured to store information, data, content, applications, instructions, or the like for enabling the apparatus to carry out various functions in accordance with example embodiments of the present invention.

The processor 202 is embodied in a number of different ways and may, for example, include one or more processing devices configured to perform independently. In some preferred and non-limiting embodiments, the processor 202 includes one or more processors configured in tandem via a bus to enable independent execution of instructions, pipelining, and/or multithreading. The use of the term "processing circuitry" is understood to include a single core processor, a multi-core processor, multiple processors internal to the apparatus, and/or remote or "cloud" processors.

In some preferred and non-limiting embodiments, the processor 202 is configured to execute instructions stored in the memory 204 or otherwise accessible to the processor 202. In some preferred and non-limiting embodiments, the processor 202 is configured to execute hard-coded functionalities. As such, whether configured by hardware or software methods, or by a combination thereof, the processor 202 represents an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed. In some embodiments, the memory 204 may also include one or more of the module data store 118, the workflow data store 120, the usage data store 122, and/or the data store 124. In some embodiments, the memory 204 may be a non-transitory memory including program code that is configured to cause the apparatus 200 to provide various functionality associated with the MMS 102, WMS 104, and/or the CMS 106.

In some embodiments, the apparatus 200 includes input/output circuitry 206 that is, in turn, be in communication with processor 202 to provide output to the user and, in some embodiments, to receive an indication of a user input. The input/output circuitry 206 comprises a user interface (e.g., ACMF interface) and includes a display, and includes a web user interface, a mobile application, a query-initiating computing device, a kiosk, or the like. In some embodiments, the input/output circuitry 206 also includes a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 is any means such as a device or circuitry embodied in either hardware or a combination of hardware and software that is configured to receive and/or transmit data from/to a network and/or any other device, circuitry, or module in communication with the apparatus 200. In this regard, the communications circuitry 208 includes, for example, a network interface for enabling communications with a wired or wireless communication network. For example, the communications circuitry 208 includes one or more network interface cards, antennae, buses, switches, routers, modems, and supporting hardware and/or software, or any other device suitable for enabling communications via a network. Additionally or alternatively, the communications circuitry 208 includes the circuitry for interacting with the antenna/antennae to cause transmission of signals via the antenna/antennae or to handle receipt of signals received via the antenna/antennae.

The ACMF circuitry 210 comprises a device or circuitry embodied in either hardware or a combination of hardware and software that is configured to provide change management workflows for one or more organizations, enabling organizations to create and manage one or more service operations. For example, the ACMF circuitry 210 may include specialized circuitry that are configured to perform the functions of one or more of the MMS 102, the WMS 104, and/or the CMS 106.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Example Methods of Use

Figure 4:
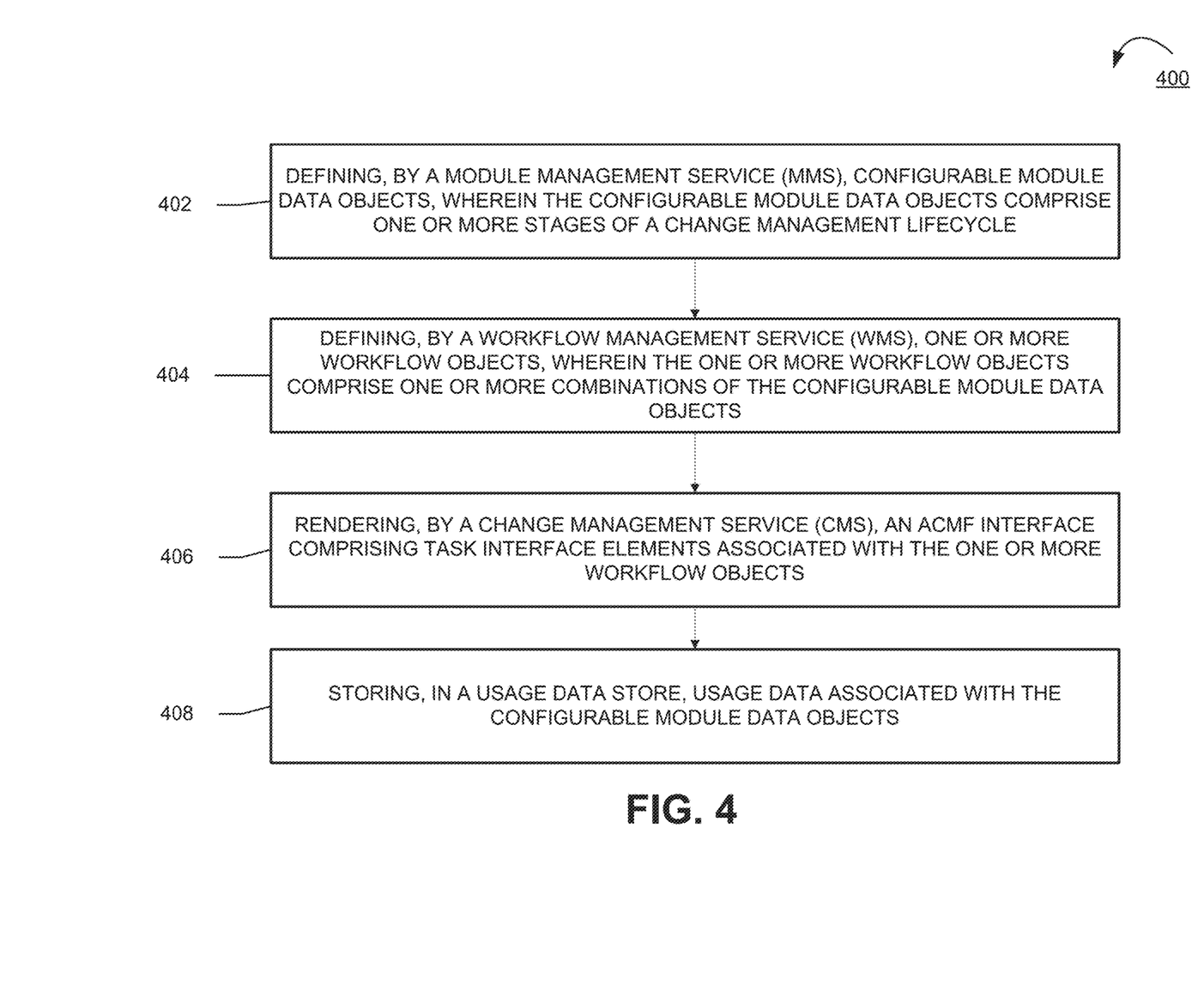
FIG. 4 shows a flow chart illustrating an example method of using an example ACMF system in accordance with various embodiments of the present disclosure.

FIG. 4 shows an example flow chart illustrating an example method of use 400 of an example ACMF. In some embodiments, the method of use 400 may be a computer-implemented method for defining an ACMF. The method of use 400 is described with respect to the system 100 and apparatus 200 and their various components, as previously described. It will be understood that the method of use 400 may be implemented using any suitable system, apparatus, and their various components.

In some embodiments, the method 400 includes a step 402 of defining, by an MMS, configurable module data objects, wherein the configurable module data objects comprise one or more stages of a change management lifecycle. In some embodiments, the MMS 102 defines the one or more CMDOs for an MMS based at least in part on input from an administrator (e.g., Admin A). In some embodiments, the administrator defines CMDOs that are associated with one or more stages in a change management workflow. In some embodiments, the administrator also sets various parameters of the CMDOs, such as rule definition data, acceptance criteria data, and/or stage duration data.

In some embodiments, the method 400 includes a step 404 of defining, by a WMS, one or more workflow objects, wherein the one or more workflow objects comprise one or more linked combinations of the configurable module data objects. In some embodiments, the WMS defines the one or more workflow objects based at least in part on input from an administrator (e.g., Admin B, but it should be noted that the same administrator may define both the CMDOs and the workflow objects). In some embodiments, the workflow objects are defined such that they link the one or more CMDOs in certain sequences and combinations that are desired by an organization for creating and managing service operations. For example, an administrator may define workflow objects that link and sequence CMDOs in favor of a more rigid, ITIL-focused approach, or in favor of a leaner, DevOps-focused approach.

In some embodiments, the method 400 includes a step 406 of rendering, by a CMS, an ACMF interface comprising task interface elements associated with the one or more workflow objects. In some embodiments, the CMS renders the ACMF interface based at least in part by input from one or more user(s) of the ACMF system. In some embodiments, the user(s) engage with the ACMF interface to execute one or more workflow objects. In some embodiments, after the ACMF interface is rendered, it may provide one or more service operations to users of the ACMF system. In some embodiments, data relating to the one or more service operations may be stored in a data store.

In some embodiments, the method 400 includes a step 408 of storing, in a usage data store, usage data associated with the CMDOs. In some embodiments, the usage data may be based at least in part on the RDD, ACD, and/or the SDD associated with one or more of the CMDOs.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An adaptive change management framework (ACMF) system for service operations, the ACMF system comprising:
a module management service (MMS) executed by first processing circuitry, wherein the MMS is configured to define configurable module data objects (CMDOs) associated with one or more stages of a change management lifecycle,
wherein each configurable module data object (CMDO) is structured to include at least one of: rule definition data (RDD), acceptance criteria data (ACD), or stage duration data (SDD),
and wherein the MMS is further configured to generate usage data for the CMDOs based at least in part on the RDD, ACD, or the SDD;
a workflow management service (WMS) executed by second processing circuitry, wherein the WMS is configured to define one or more workflow objects, wherein the one or more workflow objects comprise linked combinations of CMDOs; and
a change management service (CMS) executed by third processing circuitry, wherein the CMS is configured to cause rendering of an ACMF interface comprising task interface elements associated with the one or more workflow objects.

2. The ACMF system of claim 1, wherein the one or more stages comprise a create stage, a review stage, an approve stage, or a plan stage.

3. The ACMF system of claim 1, wherein the CMDOs are configured to define an intensive state based on user configuration of the RDD, ACD, or SDD.

4. The ACMF system of claim 1, further comprising a module data store, wherein the module data store is configured to store the CMDOs.

5. The ACMF system of claim 4, further comprising a workflow data store, wherein the workflow data store is configured to store the one or more workflow objects.

6. The ACMF system of claim 5, further comprising a usage data store, wherein the usage data store is configured to store the usage data of the CMDOs.

7. The ACMF system of claim 6, further comprising one or more machine learning (ML) modules configured to access one or more of the module data store, the workflow data store, and the usage data store and to thereby generate training data for defining the CMDOs or the one or more workflow objects.

8. The ACMF system of claim 1, wherein the WMS is further configured to receive one or more pieces of metadata to further define the one or more workflow objects.

9. The ACMF system of claim 8, wherein the one or more pieces of metadata comprise: a designation for a user with permissions to review or approve the CMDOs; or a designation for a communication channel for one or more users to collaborate on the CMDOs.

10. The ACMF system of claim 1, wherein the CMS comprises a plurality of microservices, and wherein each microservice of the plurality of microservices comprises a respective data store configured to execute the one or more stages of the change management lifecycle.

11. An apparatus for providing an adaptive change management framework (ACMF), the apparatus comprising:
a processor; and
a non-transitory memory including program code,
wherein the non-transitory memory and the program code are configured to, with the processor, cause the apparatus to provide:
a module management service (MMS) configured to define configurable module data objects (CMDOs) associated with one or more stages of a change management lifecycle, wherein each configurable module data object (CMDO) is structured to include at least one of: rule definition data, acceptance criteria data, or stage duration data;
a workflow management service (WMS) configured to define one or more workflow objects, wherein the one or more workflow objects comprise linked combinations of CMDOs; and
a change management service (CMS) configured to cause rendering of an ACMF interface comprising task interface elements associated with the one or more workflow objects.

12. The apparatus of claim 11, wherein the one or more stages comprise a create stage, a review stage, an approve stage, or a plan stage.

13. The apparatus of claim 12, wherein the CMDOs are configured to define an intensive state based on user configuration of rule definition data (RDD), acceptance criteria data (ACD), or stage duration data (SDD).

14. The apparatus of claim 11, wherein the apparatus is further configured to provide a module data store, and wherein the module data store is configured to store the CMDOs.

15. The apparatus of claim 14, wherein the apparatus is further configured to provide a workflow data store, and wherein the workflow data store is configured to store the one or more workflow objects.

16. The apparatus of claim 15, wherein the apparatus is further configured to provide a usage data store, and wherein the usage data store is configured to store usage data from the one or more workflow objects.

17. The apparatus of claim 16, wherein the apparatus is further configured to provide one or more machine learning (ML) modules configured to store training data from one or more of the module data store, the workflow data store, and the usage data store, wherein the one or more ML modules are configured to generate one or more suggestions for defining the CMDOs or the one or more workflow objects.

18. The apparatus of claim 11, wherein the WMS is further configured to receive one or more pieces of metadata to further define the one or more workflow objects.

19. The apparatus of claim 18, wherein the one or more pieces of metadata comprise: a designation for a user with permissions to review or approve the CMDOs; or a designation for a communication channel for one or more users to collaborate on the CMDOs.

20. A computer-implemented method for defining an adaptive change management framework (ACMF), the method comprising:
- defining, by a module management service (MMS), configurable module data objects (CMDOs), wherein the CMDOs are associated with one or more stages of a change management lifecycle;
- defining, by a workflow management service (WMS), one or more workflow objects, wherein the one or more workflow objects comprise one or more linked combinations of the CMDOs;
- rendering, by a change management service (CMS), an ACMF interface comprising task interface elements associated with the one or more workflow objects; and
- storing, in a usage data store, usage data associated with the CMDOs.

* * * * *